United States Patent
Williams

[19]

[11] Patent Number: 5,906,752
[45] Date of Patent: *May 25, 1999

[54] SELF-CLEANING BELT FILTER WITH EDGE SEALING MEANS AND METHOD

[75] Inventor: Roger D. Williams, Dallas, N.C.

[73] Assignee: Pneumafil Corporation, Charlotte, N.C.

[ * ] Notice: This patent is subject to a terminal disclaimer.

[21] Appl. No.: 08/690,599

[22] Filed: Jul. 30, 1996

Related U.S. Application Data

[63] Continuation-in-part of application No. 08/500,572, Jul. 11, 1995, Pat. No. 5,560,835.

[51] Int. Cl.$^6$ .......................... B01D 33/048; B01D 41/00; B01D 46/22
[52] U.S. Cl. .......................... 210/783; 210/791; 210/400; 210/493.1; 210/407; 210/416.1; 55/290; 55/302; 55/354; 95/277; 95/278
[58] Field of Search ..................................... 210/400, 791, 210/401, 387, 783, 493.1, 493.2, 407, 409, 416.1, 391; 55/290, 301, 302, 354, 400, 467; 95/277, 278

[56] References Cited

U.S. PATENT DOCUMENTS

| | | |
|---|---|---|
| 2,335,144 | 11/1943 | Dahlman . |
| 2,463,723 | 3/1949 | Spraragen . |
| 4,037,338 | 7/1977 | Berline ..................................... 210/401 |
| 4,187,091 | 2/1980 | Durr et al. . |
| 4,725,292 | 2/1988 | Williams . |
| 4,772,398 | 9/1988 | Sando et al. . |
| 4,842,749 | 6/1989 | Cox . |
| 4,875,913 | 10/1989 | Barzuza . |
| 4,948,502 | 8/1990 | Anderson .................................. 210/401 |
| 5,008,007 | 4/1991 | Anderson .................................. 210/401 |
| 5,089,143 | 2/1992 | Anderson .................................. 210/401 |
| 5,346,519 | 9/1994 | Williams . |
| 5,730,767 | 3/1998 | Helmlinger ............................. 210/400 |

FOREIGN PATENT DOCUMENTS

| | | |
|---|---|---|
| 2544219 | 10/1984 | France . |
| 654306 | 6/1963 | Italy . |
| 304964 | 5/1972 | U.S.S.R. . |
| 743876 | 1/1956 | United Kingdom . |

*Primary Examiner*—Robert Popovics
*Attorney, Agent, or Firm*—Kennedy Covington Lobdell & Hickman

[57] ABSTRACT

A self-cleaning filter apparatus for use in removing particulate matter from a transport fluid, such as air, which includes a housing having a pair of spaced pulleys over which an endless filter belt is positioned to present two generally straight filter reaches and two generally curved filter reaches. The endless filter belt includes a permeable substrate formed as an endless belt and a plurality of pleats of filter media extending outwardly from the surface of the substrate so that the transport fluid can pass inwardly therethrough and deposit the particulate material on the exterior surface of the pleats. A suction nozzle and/or an air discharge device is positioned adjacent the outer surface of the endless filter at one of the curved reaches thereof for removing particulate matter deposited on the pleats as they pass along such curved reach. The filter belt may be supported for movement by the housing at the opposite side edges of the filter belt, and the housing supports may be provided with suction channels for sealing the side edges of the filter belt.

6 Claims, 12 Drawing Sheets

SELF-CLEANING BELT FILTER WITH EDGE SEALING MEANS AND METHOD

CROSS-REFERENCE TO RELATED APPLICATION

This is a continuation-in-part application of Ser. No. 08/500,572, filed Jul. 11, 1995, now U.S. Pat. No. 5,560,835.

BACKGROUND OF THE INVENTION

This invention relates generally to filters and dust collectors and, more particularly, to apparatus of this general type which includes some arrangement for automatically cleaning the filter media continuously or at periodic intervals.

There are many types of filters and dust collectors which include some form of filter media through which transport air or other fluid having dust or other foreign matter entrained therein is passed to deposit the foreign matter on the exposed surface of the filter media, and in industrial and similar heavy-duty applications where the filtered foreign matter collects on the surface of the filter media at a relatively rapid rate, it is desirable to provide the apparatus with some form of automatic cleaning of the filter media so that it can be run on a continuous basis.

For example, the typical industrial bag-type filter includes some form of reverse air flow, or "backwashing," of cleaning air opposite to the normal flow of the transport air which lifts the foreign matter collected on the exposed surface of the bag off of the bag so that it can gradually migrate downwardly to the bottom of the filter apparatus where it can be collected and removed. Similarly, in typical pleated paper filters, a high pressure pulse of cleaning air is passed back through pleated paper filter cartridges to move the foreign matter away from the surface of the filter media. In cleaning arrangements of this type, the efficiency of the cleaning is reduced by the fact that the foreign matter, when it is temporarily moved away from the surface of the filter, is not immediately transported away from the filter, but is instead allowed to sometimes be re-entrained in the transport air and brought back to the surface of the filter, albeit at a different (e.g., lower) location on the filter.

In other types of filters, belts or substrates of filter media are used, and because of the nature of such filter media it is possible to use a suction nozzle positioned adjacent the surface of the substrate for removing the collected foreign or particulate matter therefrom and then using the suction to transport the foreign or particulate matter away from the filter for collection and removal. In some filters of this type, the flat filter is stationary and the cleaning nozzle is moved across the surface of the filter media as disclosed, for example in Williams U.S. Pat. No. 4,725,292, and in other designs the filter media is moved past a stationary suction nozzle. While the efficiency of the cleaning apparatus in these filters is very high since the foreign matter is positively removed from the filter media and carried away, the filtering efficiency of the filter apparatus itself is relatively small because the filter media is in a flat or planar form which, for a given size of filter apparatus, offers a relatively low air-to-cloth ratio as compared, for example, with the above-described pleated paper filters.

In accordance with the present invention, a unique filtering apparatus and method are provided which combines the high cleaning efficiency of belt-type filters with the high filtering efficiency of filters having a pleated filter media.

SUMMARY OF THE INVENTION

Briefly summarized, the present invention provides a self-cleaning filter apparatus and method for use in removing particulate matter from a transport fluid, which includes an endless belt and having a plurality of pleats of filter media extending outwardly from one surface of the substrate, such pleats being arranged on the substrate so that the transport fluid can pass inwardly therethrough and deposit the particulate material on the exterior surface of the pleats. A housing is provided that includes a support frame for supporting the endless belt for movement along a predetermined path that includes at least one straight reach in which the pleats extend outwardly from the substrate in generally spaced parallel relation to one another, and at least one curved reach in which the pleats extend outwardly from the substrate in angular relation to one another such that the spacing between adjacent pleats increases along the outwardly extending direction thereof. At least one drive element is provided for engaging the endless belt to move it along the predetermined path, and a clean air chamber is disposed at the interior portion of the endless belt from which the transport fluid can be removed after it has passed through the pleats and the substrate. In one embodiment of the present invention, a suction nozzle is positioned adjacent the outer surface of the endless belt at the curved reach thereof for removing the particulate matter deposited on the pleats.

The substrate includes imperforate edge portions extending along the side edges thereof, and the support frame includes a pair of support surfaces positioned in spaced relation for supporting the imperforate edge portions of the substrate, and each of the support surfaces is formed with a suction channel extending therealong beneath the substrate edge portions for drawing the substrate edge portions against the support surfaces in sealed relation thereto. The substrate is preferably made of a different material from the filter media, and the filter media is attached to the substrate for movement therewith.

In another embodiment of the present invention, the filtering substrate is mounted on a cylindrical support frame which has one closed end and one open end through which the transport air is removed after it has passed through the substrate and been cleaned, and a face plate is disposed closely adjacent the open end of the support frame, such face plate having an annular suction channel formed therein with the open end of the suction channel being located adjacent the outer periphery of the cylindrical support frame. A strip of sealing material is mounted on the cylindrical support frame along the outer periphery thereof, and this strip of sealing material is arranged to extend across the annular suction channel formed in the face plate, whereby the suction in the suction channel will draw the strip of sealing material across the open end of the suction channel to provide a seal between the open end of the cylindrical support frame and the face plate. One or more suction nozzles may be used to clean the filtering substrate by removing particulate matter therefrom, and the same suction source used for these suction nozzles may also be used to create the suction in the suction channel.

Also, in one embodiment, the housing preferably includes a rotating roller having an imperforate cylindrical support surface for supporting the substrate at the curved reach thereof, whereby the suction nozzle, during cleaning, is not working against transport air passing through the filter media at such curved reach. In this embodiment of the present invention, the suction nozzle extends across the width of the endless belt with one end thereof adapted to be connected to a suction source, and this suction nozzle is formed with a gradually decreasing cross-sectional area along the extending length thereof from such one end thereof so as to generally equalize the suction force imposed on said substrate across the width thereof In another embodiment of the present invention, the substrate is cleaned by an air discharge device that is positioned adjacent the inner surface of the substrate at the curved reach thereof for directing a flow of cleaning fluid outwardly through the substrate to remove particulate matter deposited on the pleats of the substrate as the substrate moves through its above-described curved reach. Preferably, the air discharge device includes a hollow cylinder over which the inner surface of the substrate passes at the curved reach thereof, and this cylinder has air discharge openings formed therein so that pressurized air introduced into the interior of the cylinder flows outwardly through the openings. The openings may be formed in a perforate portion as generally semi-cylindrical but has an arcuate extent of less than 180°, and a pressurized air discharge pipe is mounted within the cylinder coaxially therewith to generate pulses of pressurized air that are directed outwardly toward the imperforate portion of the cylinder. Also, the pulses of cleaning air may have a predetermined duration and may occur at predetermined frequencies coordinated with the speed of movement of the substrate so that a different portion of the substrate is cleaned by such pulses during each consecutive complete revolution of the substrate along its path of movement. This coordinated movement of the substrate may include a timing belt attached to the substrate and a timing pulley for driving the timing belt, with the timing belt and timing pulley each having teeth for engagement with one another and wherein the number of teeth on the belt is not evenly divisible by the number of teeth on the timing pulley.

DETAILED DESCRIPTION OF THE PREFERRED EMBODIMENTS

Figure 1:
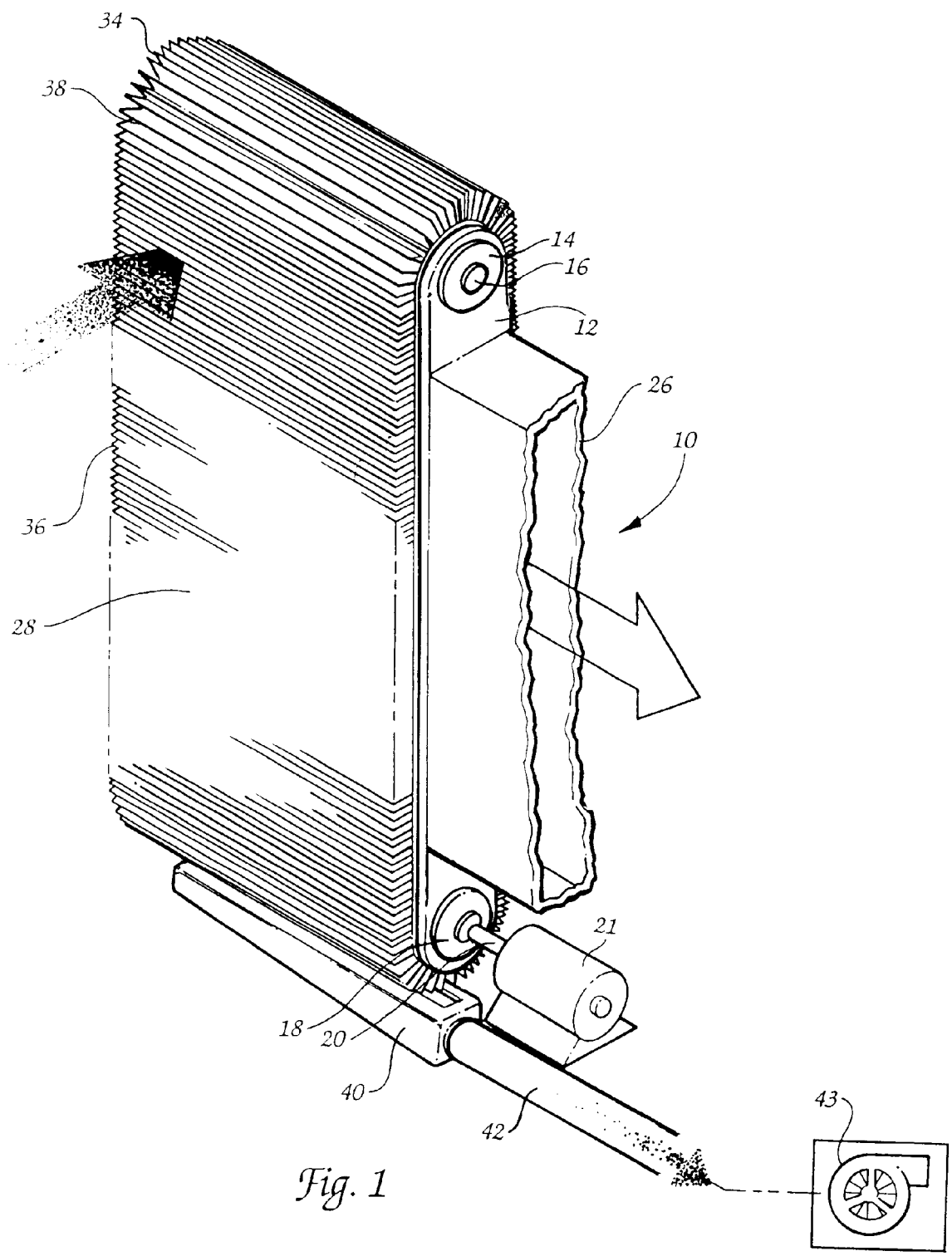
FIG. 1 is a perspective view of a dust collector or filter apparatus embodying the present invention.

Looking now in greater detail at the accompanying drawings, one embodiment of the dust collector or filter apparatus 10 is illustrated, and it includes a housing 12 which supports an upper pulley 14 mounted for rotation on a shaft 16, and a lower drive pulley 18 having a drive shaft 20 which can be connected to any convenient drive source, such as a drive motor 21.

Figure 4:
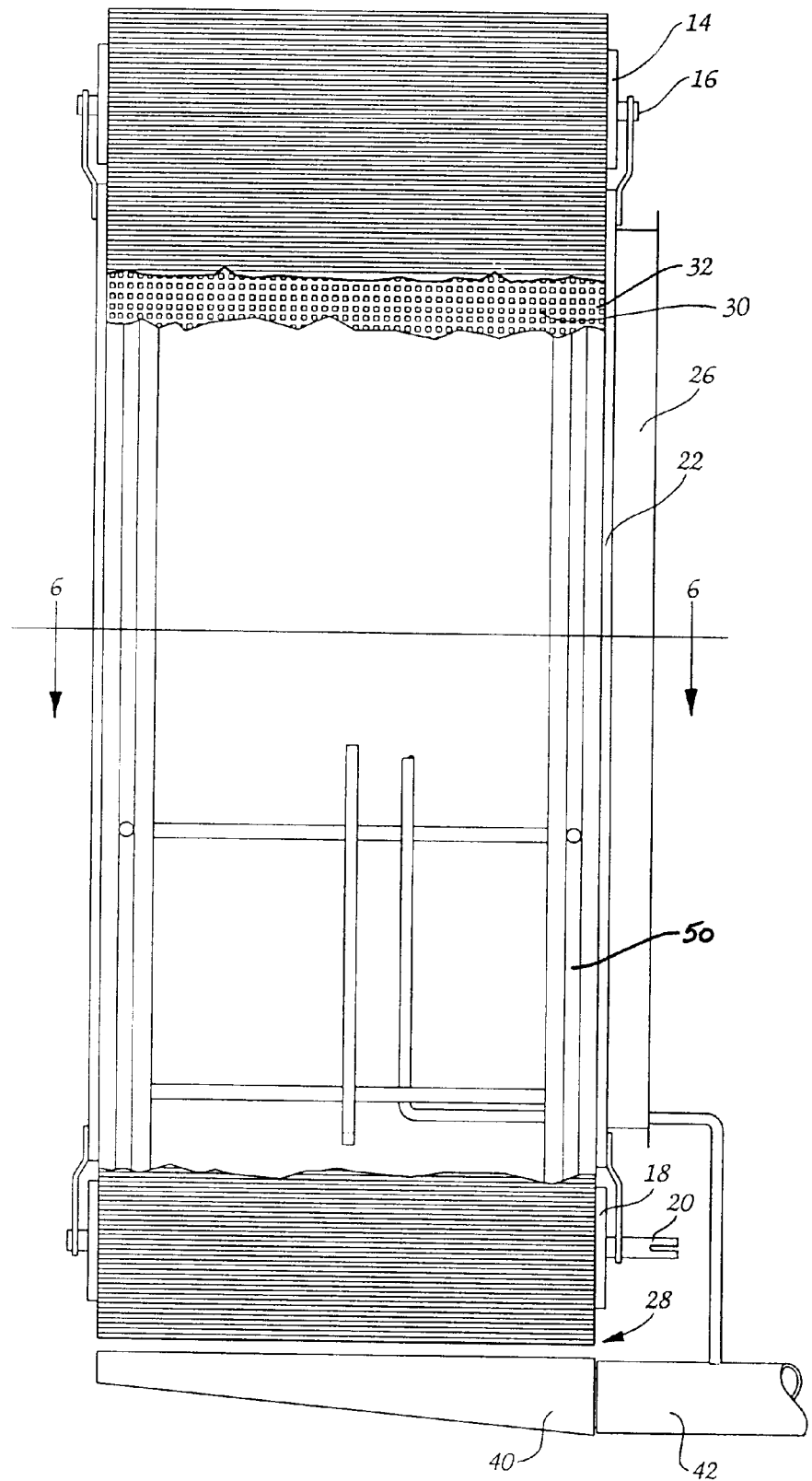
FIG. 4 is a side elevational view of the dust collector illustrated in FIG. 1.
Figure 6:
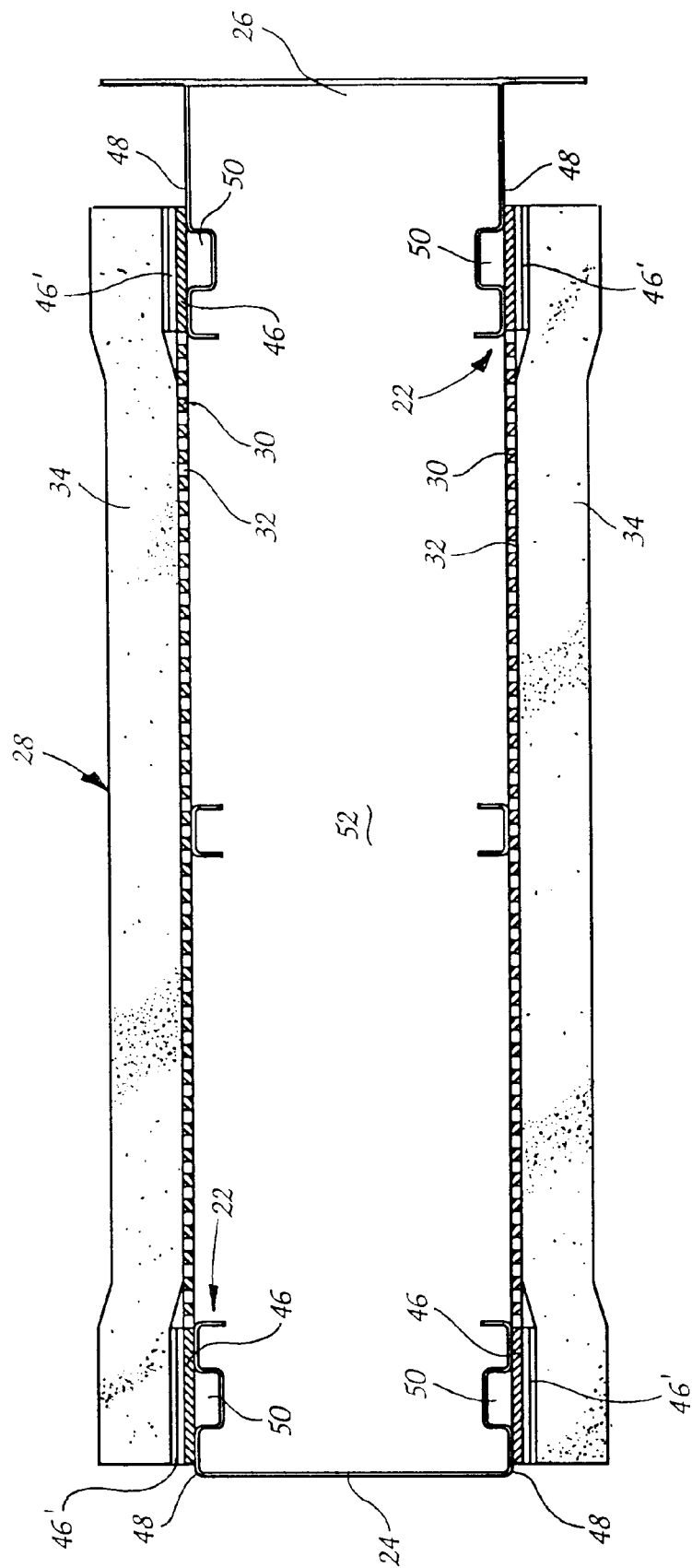
FIG. 6 is a detailed view taken along section line 6—6 in FIG. 4.

As best seen in FIGS. 4 and 6, the housing 12 includes an interior frame 22 formed with a closed side wall 24 at one side thereof, and a clean air outlet conduit 26 is formed at the other side portion to permit withdrawal of the clean air, as will be described in greater detail presently.

Figure 3:
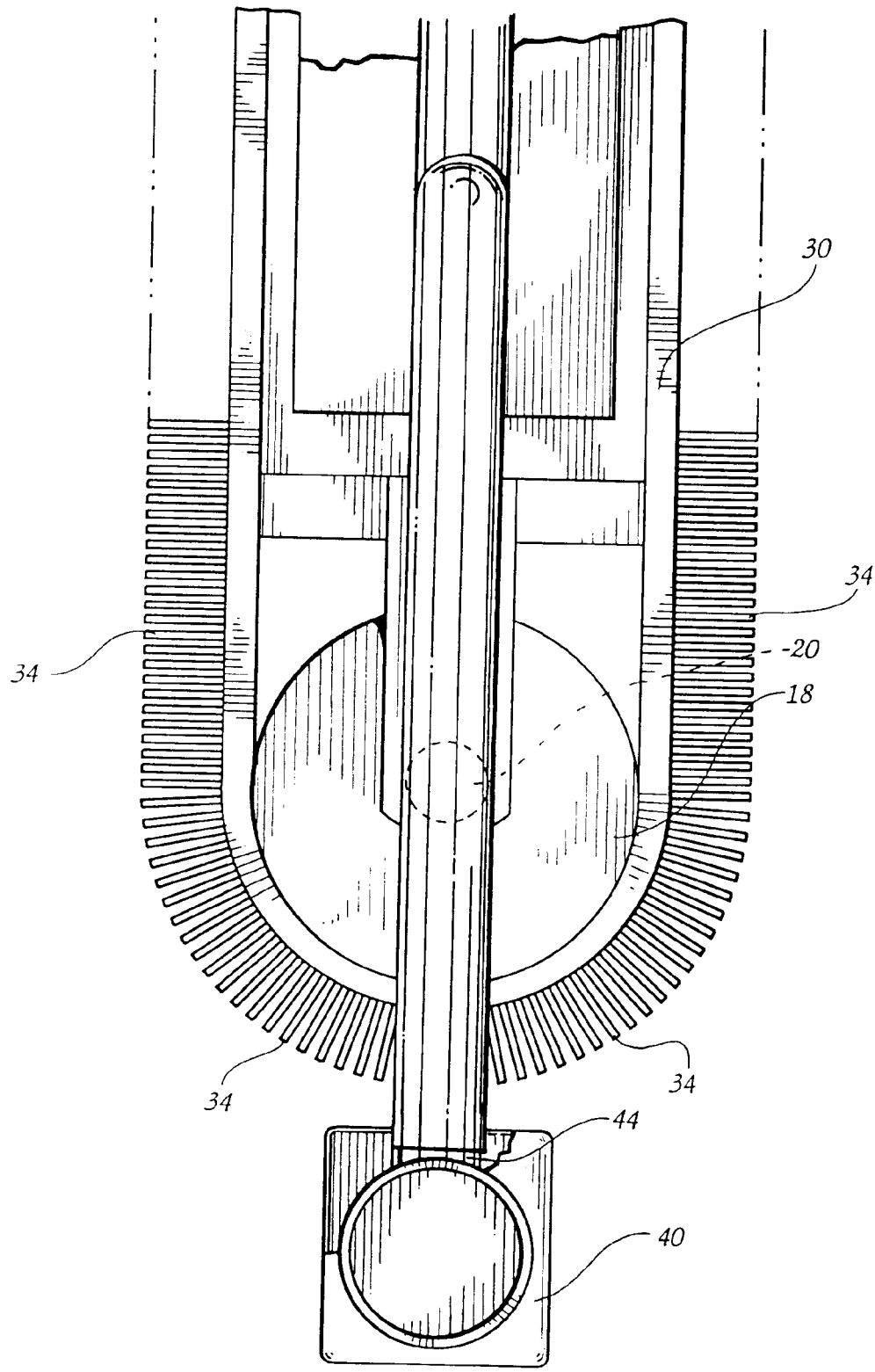
FIG. 3 is a detailed view of the bottom portion of the dust collector illustrated in FIG. 2.

A filter element 28 is comprised of a flexible substrate 30 having a plurality of openings 32 extending therethrough and a filter media 34 which is in the form of a plurality of inverted U-shaped pleats 34 that, as best seen in FIG. 3, extend outwardly from the surface of the substrate 30 with a spacing between each pleat 34. The inverted U-shaped pleats 34 are closed along their outwardly extending length, but the interior of each pleat 34 is open at its connection to the substrate 30.

Depending on the particular application of the present invention, the pleats 34 may be formed on the substrate 30 in any satisfactory manner, and the filter media 34 preferably has a sinuous configuration that is attached to the substrate in a manner to be described below, a somewhat similar filter media being disclosed in Williams U.S. Pat. No. 5,346,519, which is incorporated herein by reference.

Figure 2:
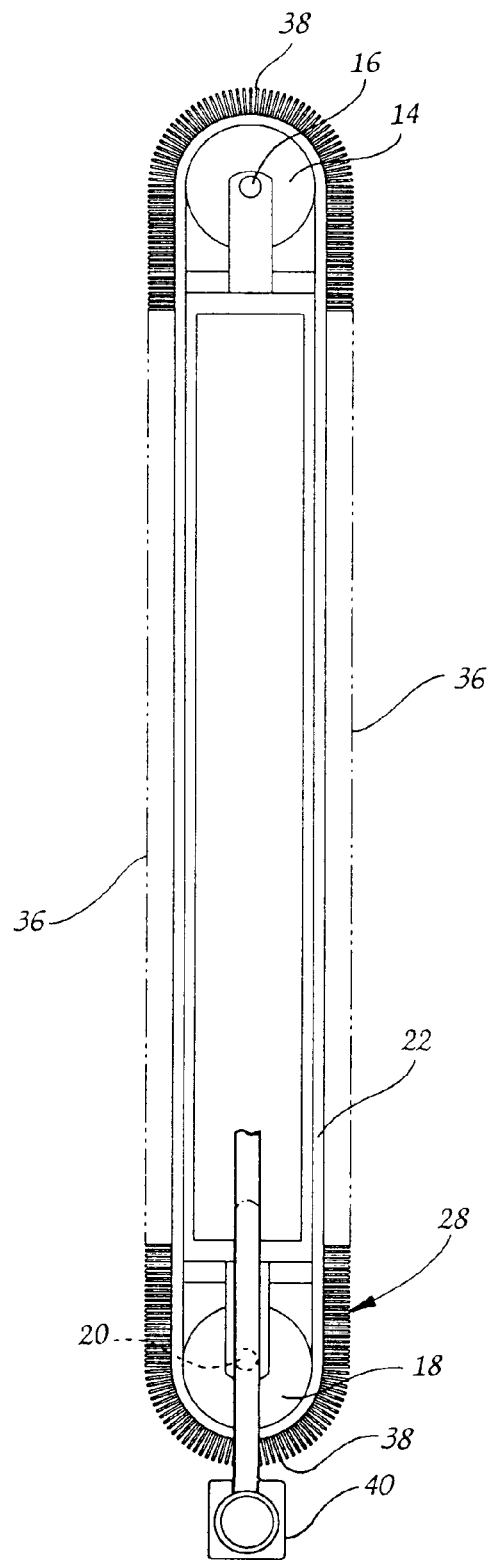
FIG. 2 is an end view of the dust collector illustrated in FIG. 1.

As best seen in FIG. 2, the filter element 28 is an endless belt that is mounted about the upper pulley 14 and the lower drive pulley 18 so as to present two generally parallel straight reaches 36 and two curved reaches 38 at the point where the filter element passes over the pulleys 14,18. The pleats 34 extend outwardly from the substrate 30 in generally spaced, parallel relation to one another with a slight spacing therebetween, and these pleats 34, at the curved reaches 38, extend outwardly from the substrate in an open angular relation to one another such that the spacing between adjacent pleats 34 increases along the outwardly extending direction thereof.

Figure 5:
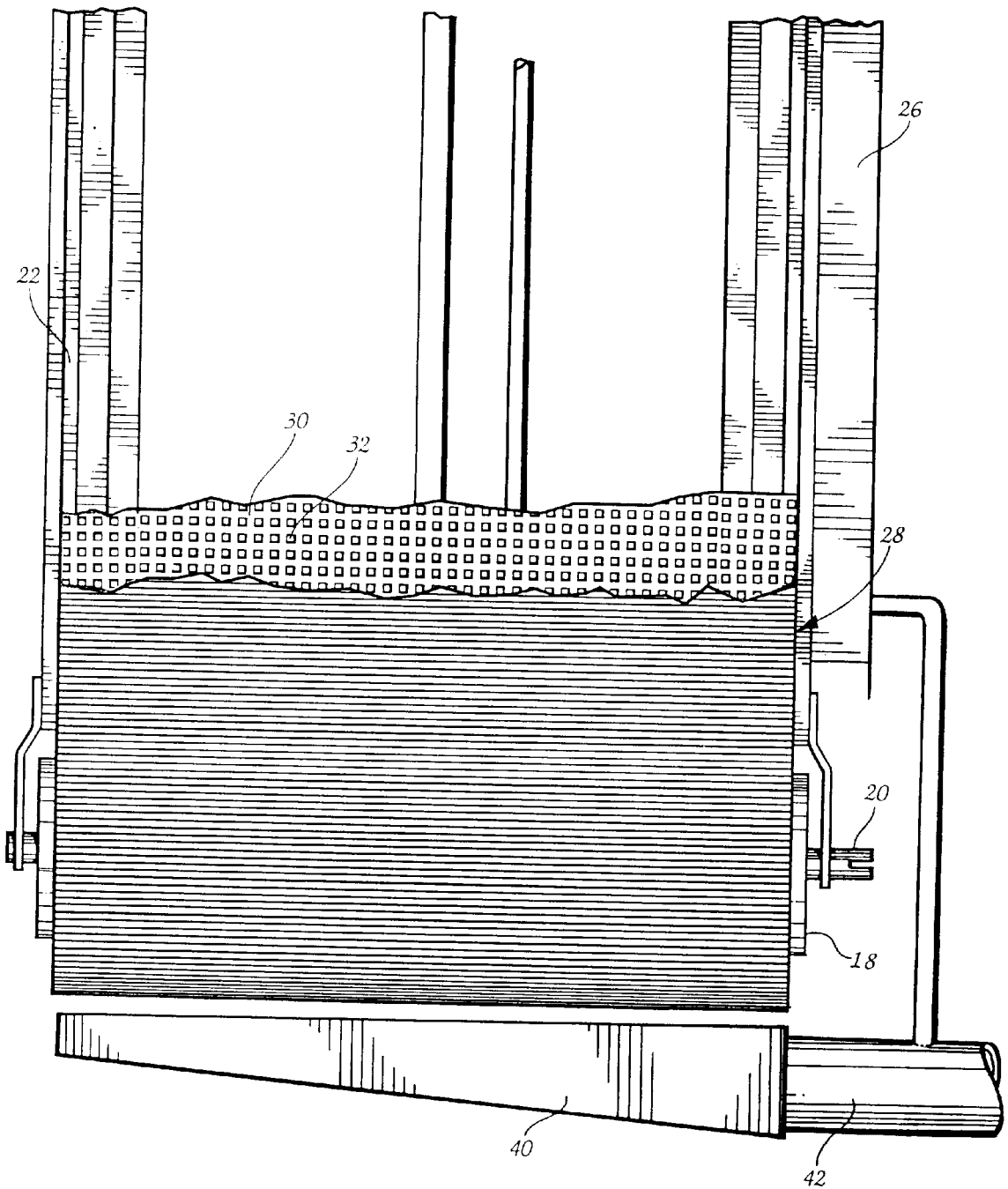
FIG. 5 is a detailed view of the bottom portion of the dust collector illustrated in FIG. 4.

The housing 12 is also provided with a suction nozzle 40 which is positioned adjacent the outer surface of the endless filter element 28 at one of the curved reaches 38 thereof, and, as best seen in FIG. 5, the suction nozzle 40 extends across the entire width of the filter element 28 with one end 42 thereof connected to any convenient source of suction, such as a suction blower 43, and the suction nozzle has a gradually decreasing cross-sectional area along its extending length from the end 42 to generally equalize the suction force imposed on the filter element 28 through a bottom slot 44 (see FIG. 3) of the suction nozzle 40.

Figure 7:
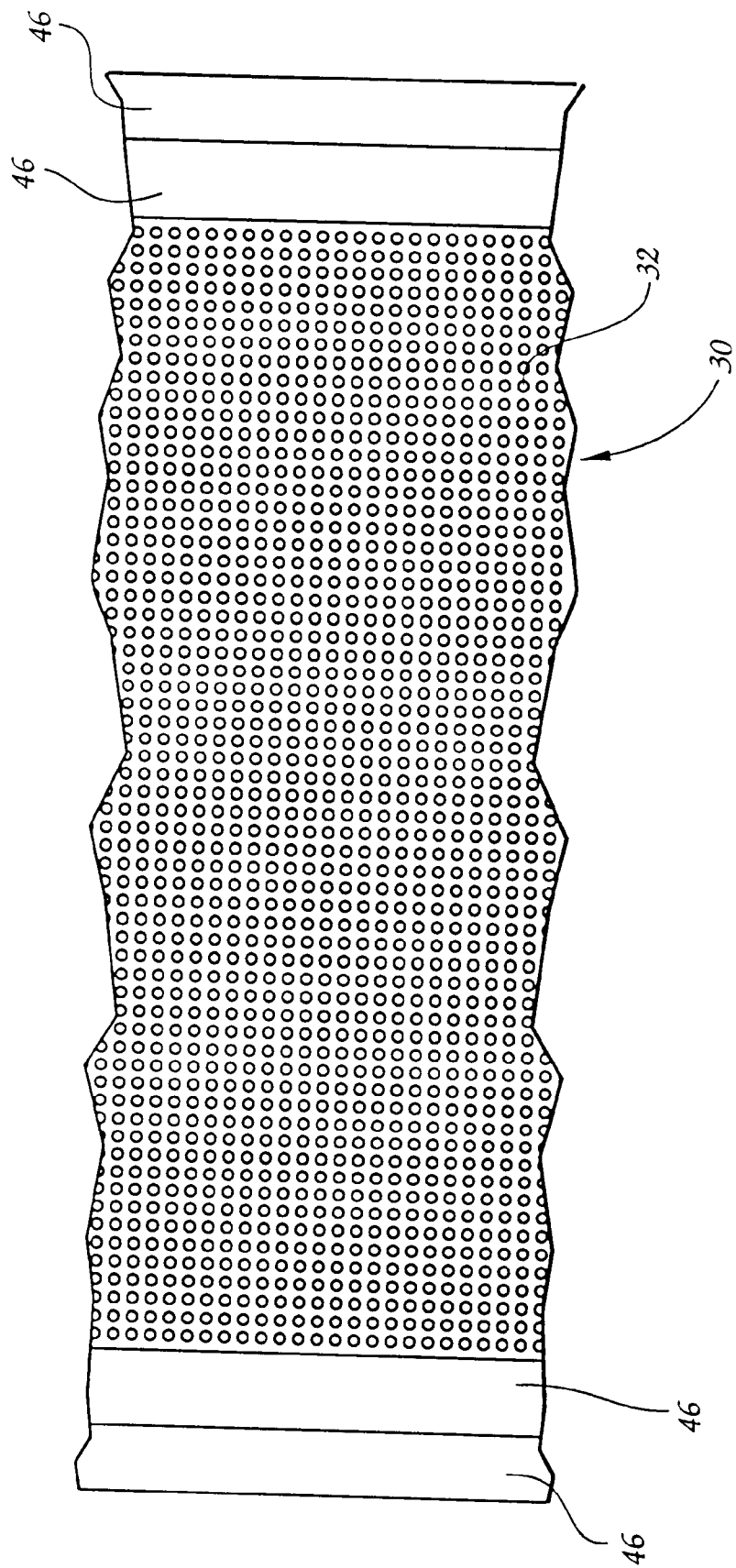
FIG. 7 is a detailed plan view of the filter element.

As best seen in FIGS. 6 and 7, the outermost side edges 46 of the substrate 30 are imperforate, and the inner surface of these side edges 46 are arranged to slide along flat support surfaces 48 formed on the frame 22. Also, in this embodiment of the present invention, the upper surface of the outermost portion 46' of the substrate 30 is formed of a Velcro-type loop material to which the filter media 34 can be attached by forming it with a corresponding Velcro-type hook material, whereby the filter media 34, which must be replaced at periodic intervals, can be easily separated from the more expensive substrate 30 and replaced.

As best seen in FIGS. 4 and 6, the flat support surfaces 48 are located on each side of the frame 22, and they extend along the entire vertical height of the dust collector 10, on both sides of the clean air chamber 52, and they have curved portions at the upper and lower ends thereof which are located adjacent the outer edges of the upper pulley 14 and the lower pulley 18 with a radius of curvature corresponding to that of the pulleys 14 and 18, so that the flat support surfaces 48 lie adjacent both the side edges of the substrate 30 along its entire generally elliptical extent.

Each of the support surfaces 48 is shaped to include a suction channel 50 that extends along the length thereof beneath the approximate mid-portion of the imperforate side edges 46 of the substrate 30, and these suction channels 50 may be connected to the same suction source connected to the suction nozzle 40, as illustrated in FIG. 4.

In operation, a quantity of transport air having entrained therein dust, lint, or any other foreign matter is introduced to the dust collector 10 at the exterior thereof, and a pressure differential is created across the filter element 28, preferably by a vacuum being imposed on the interior of the housing 12 through the clean air discharge conduit 26. This suction causes the transport air to be drawn through the pleats 34 of the filter element 28 so that foreign matter entrained in the transport air will be deposited on the exterior surfaces of the pleats 34, and the cleaned air will pass through the inverted U-shaped pleats to the interior thereof and through the openings 32 in the substrate 30 so that the cleaned air is collected in a clean air chamber 52 (see FIG. 6) within the housing 12 and can be withdrawn through the clean air discharge conduit 26. The endless filter element 28 is continuously moved through its somewhat elliptical path of movement around the pulleys 14,18, and the transport air is drawn through filter element 28 at the two straight reaches 36 thereof, and this foreign matter accumulates on the exterior surfaces of the pleats 34 during the movement of the filter element 28 along these straight reaches 36. However, when these pleats 34 reach the lower pulley 18, they proceed through one of the curved reaches 38 and, as best seen in FIG. 3, the spacing between the pleats 34 opens significantly so that the area between adjacent pleats 34, and particularly the bottom area of the spacing adjacent the substrate 30, is significantly more exposed, whereby the suction imposed on the filter element 28 by the closely adjacent suction nozzle 40 can more easily reach and withdraw foreign matter which has collected even on the innermost surfaces of the pleats 34.

Thus, one significant feature of the present invention is that the area of the filter media presented by the pleats 34 is substantially greater than the area that would be presented by a typical or conventional belt filter, such as a felt belt, in which the available filtering surface constitutes only the outer flat surface of the belt and corresponds generally to the flat outer surface of the substrate 30. More specifically, and looking at FIG. 2, the exposed surface area of each pleat 34 is the area that extends outwardly from the substrate 30 along one of the flat sides of the pleat 34, the small closed end portion of the pleat 34, and the other parallel extending side portion of the pleat 34, and the total area presented to the dirty air is the sum of the surface areas of all of the pleats 34 positioned along each of the two straight reaches 36. Moreover, the ability to clean the foreign matter from the large number of closely spaced pleats 34 is significantly enhanced by the fact that the normally close spacing between adjacent pleats 34 is substantially opened as the pleats 34 pass around the surface of the lower pulley 18, which has a relatively small radius selected to properly open the spacing between adjacent pleats 34, the extent of such opening depending on the particular application of the dust collector 10. In this embodiment of the present invention, the cylindrical support surface of the lower pulley 18 is solid and imperforate so that the suction at the interior of the housing 12 does not draw dirty transport air inwardly through the filter element 28 while the pleats 34 are being cleaned by the suction nozzle 40, whereby the suction force applied to the exterior surfaces of the pleats 34 by the suction nozzle 40 is not offset by the flow of the transport air in the opposite direction through the pleats 34.

In accordance with another feature of the present invention, a suction force in any desired amount is imposed on the suction channels 50 in the housing 12, and this suction force acts on the imperforate side edges 46 of the substrate 30 to pull the imperforate side edges 46 flush against the flat support surfaces 48 of the frame 22 and thereby seal the clean air chamber 52 and prevent the dirty transport air from passing into the clean air chamber 52 indirectly at the abutment between the moving imperforate side edges 46 and the fixed support surfaces 48. Additionally, it will be noted that, if some dirty transport air should tend to seep inwardly between the outer end of the imperforate side edge and the outer portion of the support surface 48, any such transport air will be drawn into the suction channel 50 and carried away with the suction imposed therein rather than passing all the way into the clean air chamber 52.

Another embodiment of the present invention is illustrated in FIGS. 8–11, and, since many of the structural elements in this embodiment are identical to, or substantially identical to, the corresponding elements described above, like reference numerals are used to identify these elements in FIGS. 8–11.

Figure 8:
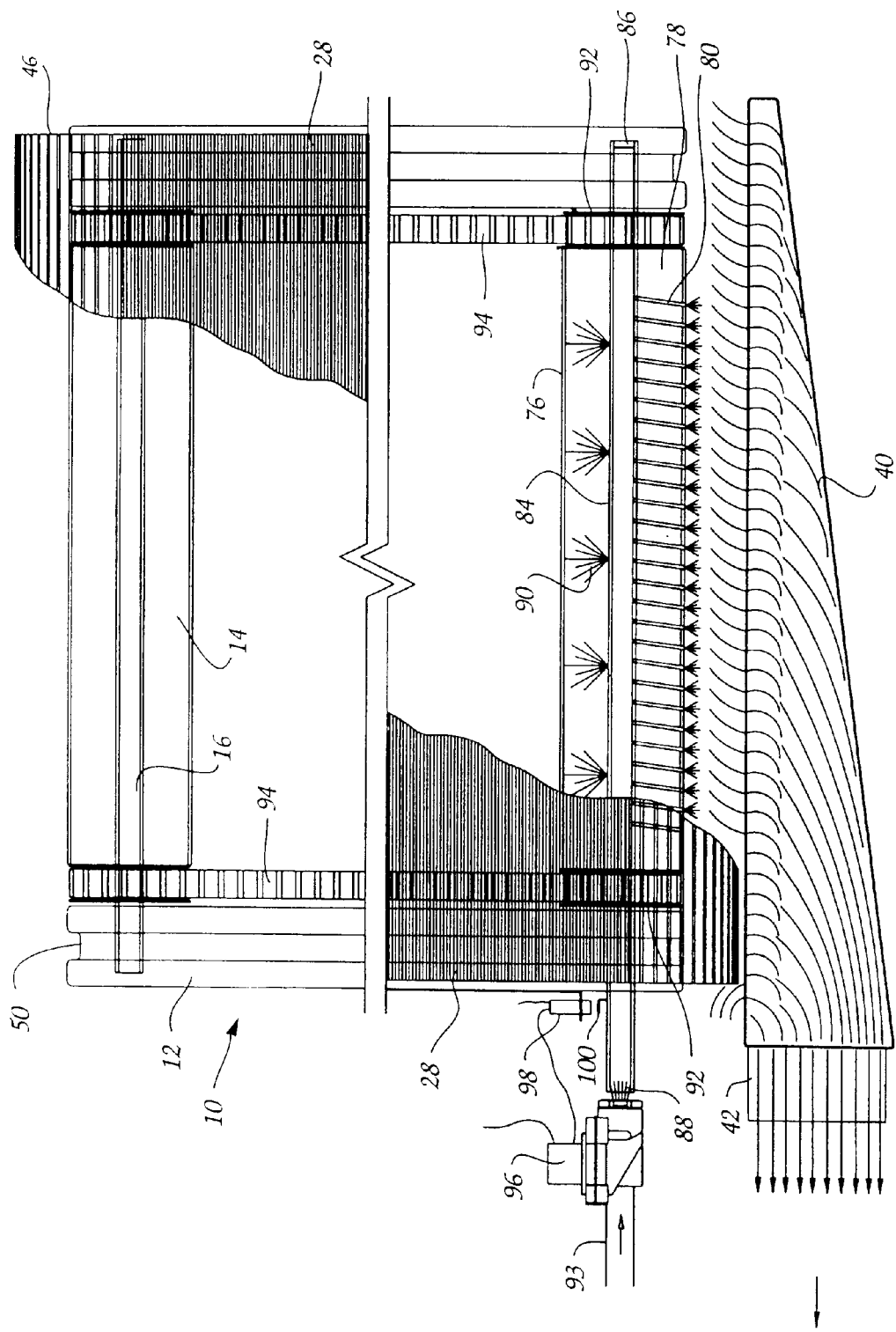
FIG. 8 is a front elevational view of another embodiment of the filter apparatus of the present invention.
Figure 9:
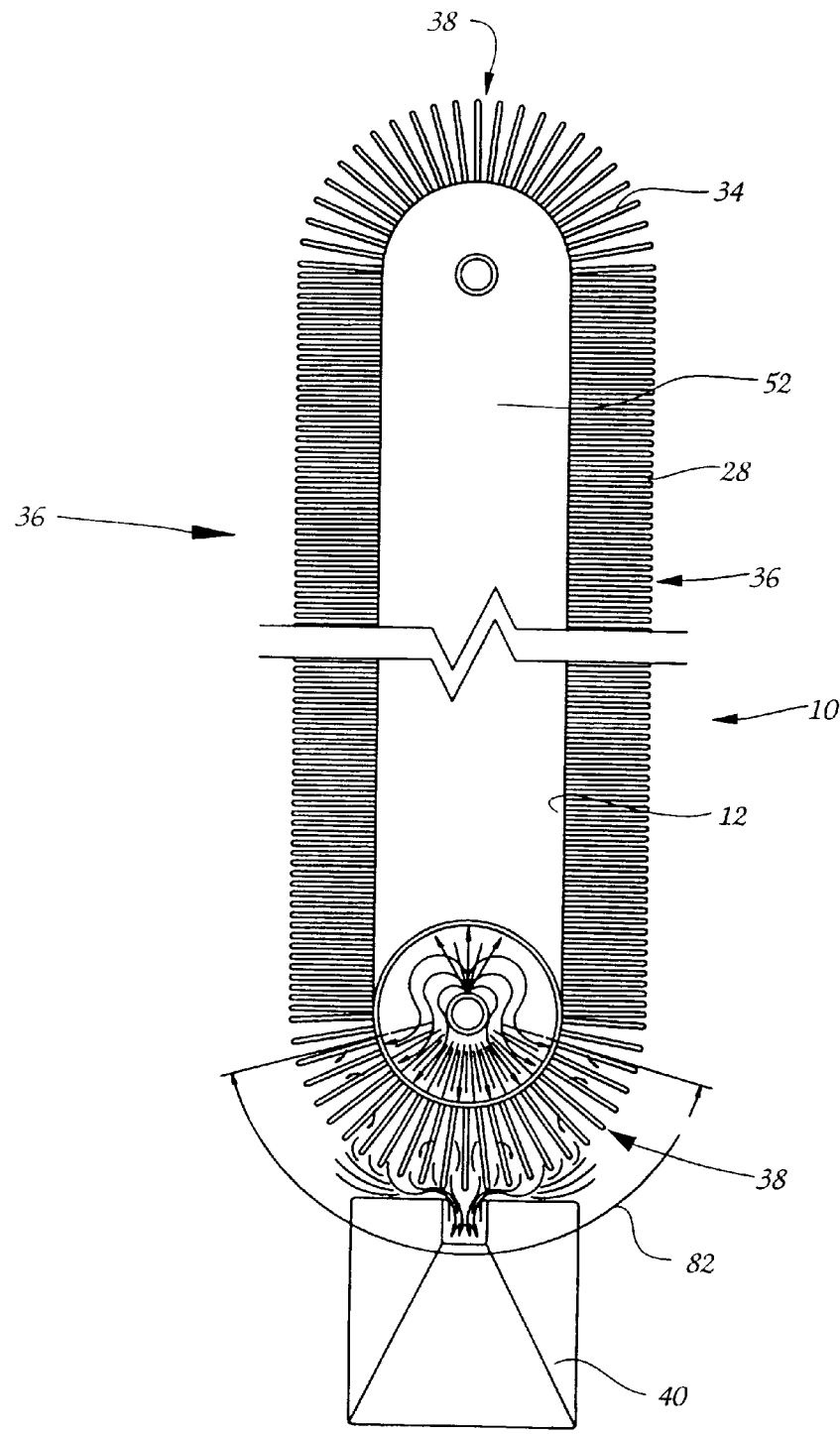
FIG. 9 is a side elevational view of the filter apparatus illustrated in FIG. 8.
Figure 10:
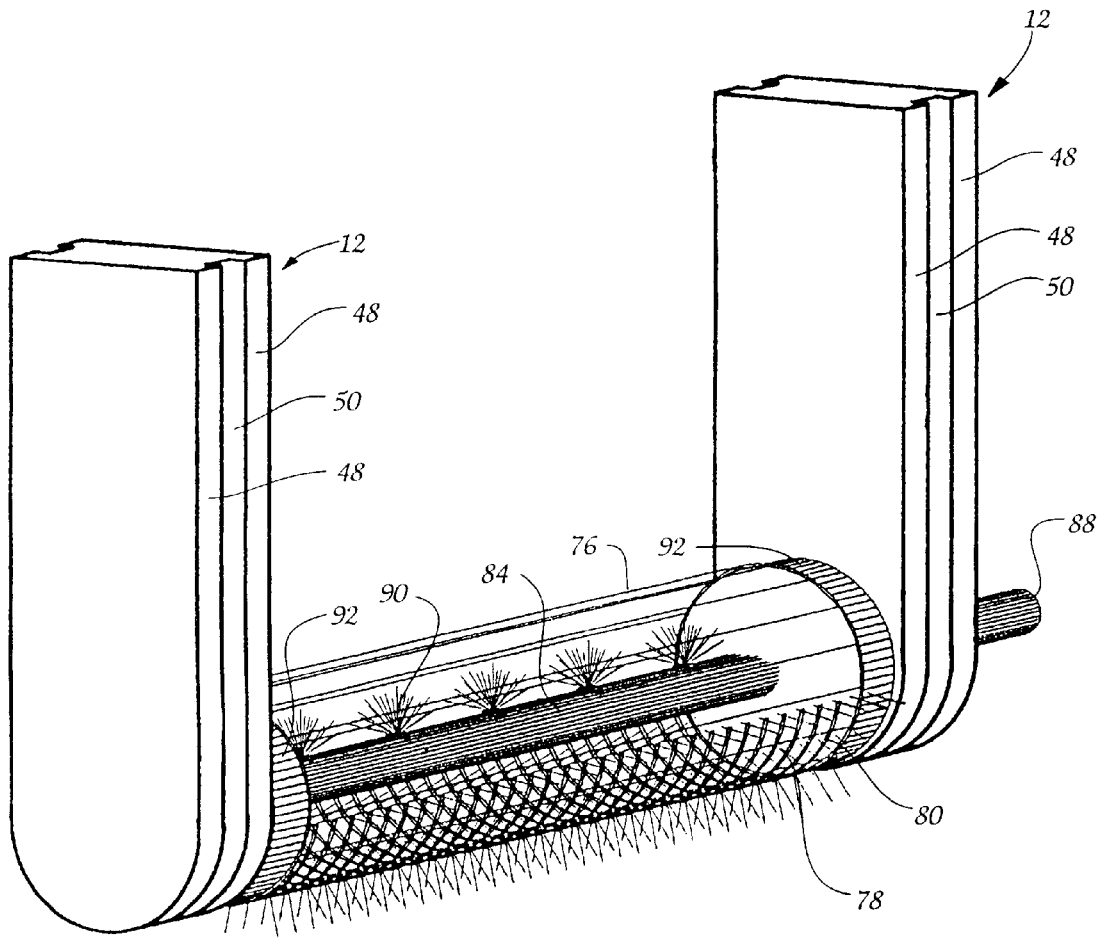
FIG. 10 is a detailed perspective view of the air discharge device of the filter apparatus illustrated in FIG. 8.

In this embodiment of the present invention, an air discharge device is supported by the housing 12 within the clean air chamber 52, and it is located at the bottom curved reach 38 of the filter media 34. More specifically, the housing 12 includes a rotating hollow cylinder 76 positioned so that the lower semi-cylindrical surface portion 78 is in supporting contact with the pleated filter media 34 as it moves through the bottom curved reach 38. As best seen in FIGS. 8 and 10, this lower semi-cylindrical portion 78 is formed with a plurality of slots or perforations 80 that extend generally around the surface of the lower semi-cylindrical portion 78 through an arcuate extent 82 (see FIG. 9). The upper half of the hollow cylinder 76 is imperforate, and the ends of the hollow cylinder are also imperforate or plugged. An air discharge pipe 84 extends through the hollow cylinder 76 coaxially therewith with one end 86 being closed and with the other end 88 being opened, and a plurality of apertures 90 are formed in a line extending along the length of the air discharge pipe 84. The air discharge pipe 84 is mounted for rotation with the hollow cylinder 76, and the ends of the air discharge pipe 84 extend outwardly from the cylinder and have fixed thereon a timing pulley 92 at each opposite end of the hollow cylinder 76, the timing pulleys 92 having conventional teeth engaging the corresponding teeth of a timing belt 94 which is mounted adjacent each side edge of the pleated filter media 28 in any conventional manner, such as using cooperating Velcro strips (not shown) fixed to the filter media 28 and the timing belt 94 so that they can be selectively attached to and detached from one another. Details of the construction of the filter media 28 are not part of the present invention and are disclosed in greater detail in U.S. Pat. No. 5,346,519.

An apparatus for generating timed pulses of cleaning air is located adjacent the open end 88 of the air discharge pipe 84, and it includes an inlet conduit 93 through which pressurized air is received from any convenient source (not shown), and a two-way solenoid operated control valve 96 that opens in response to a signal generated by a sensor 98 mounted above the air discharge pipe 84. A sensing tab 100 is mounted on the air discharge pipe 84 and extends upwardly therefrom. Accordingly, during each revolution of the air discharge pipe 84, the sensing tab 100 passes through the field of the sensor 98 which generates a signal that opens the valve 96 for a short, predetermined period of time, whereby a pulse of pressurized cleaning air is directed into the open end 88 of the air discharge pipe. Moreover, the sensing tab 100 is positioned on the air discharge pipe 84 along the same line as the perforations 90 so that the pulse of cleaning air generated by the operation of valve 96 will always be introduced into the air discharge pipe 84 when the perforations 90 therein are located at the uppermost surface portion of the air discharge pipe 84. By virtue of this arrangement, a pulse of cleaning air will be generated during each revolution of the air discharge pipe 84, and these pulses will pass through the air discharge pipe and outwardly therefrom through the perforations 90 so that the air pulses are directed upwardly toward the imperforate upper half of the hollow cylinder 76 which tends to equalize the pressure of the cleaning air that then passes outwardly through the slots 80 in the hollow cylinder 76 to clean the filter media 28 in a manner to be described in more detail below. By directing the air pulses upwardly toward the imperforate upper half of the cylinder, rather than directly through the slots 80, the air pressure of the pulses of cleaning air can be at higher levels because these pulses do not pass directly through the slots 80 in a manner that might damage the filter media 28 passing over the slots 80.

A suction nozzle 40, like that described above, may be positioned adjacent the outer surface of the filter media 28 at the bottom curved reach 38 thereof. In some filtering applications, the load on the filter may be such that it is desirable to use both the suction nozzle 40 and the above-described air discharge apparatus disposed at the inside surface of the filter media, and in other applications only one or the other of the two cleaning methods may be used.

The embodiment of the present invention illustrated in FIGS. 8–11 operates by rotating the air discharge pipe 84 using any conventional drive apparatus (not shown), whereby the timing pulleys 92 will engage the timing belts 94 and move the endless filter media 28 through its predetermined path which consists of the two straight reaches 36 thereof and the upper and lower curved reaches 38 thereof. The transport air entrained with foreign matter is drawn through the filter media 28 during movement of the filter element along the straight reaches 36 in the same manner as that described above in connection with the embodiment of FIGS. 1–7, and, as also explained above, when the pleats of the filter media pass through the lower curved reach 38, the pleats open so that the spacing between the pleats increases.

During each revolution of the air discharge pipe 84, the sensing tab 100 causes the sensor 98 to generate a signal that operates the valve 96, and a short high pressure pulse of cleaning air is discharged through the perforations 90 in an upward direction toward the upper imperforate portion of the hollow cylinder 76 and pulses of cleaning air then pass through the slots 80 in the lower semi-cylindrical half 78 of the hollow cylinder 76 so as to pass through the filter media 28 moving thereacross. Thus, in this embodiment, the pulses of cleaning air are pressurized air, and the cleaning air moves outwardly through the filter media 28 in a direction opposite to the flow of the transport air through the filter media 28, and these pulses of cleaning air remove foreign matter that has been deposited on the outside surface of the filter media 28. If desired, the suction nozzle 40 may also be used in the same manner as that described above in connection with the embodiment of FIGS. 1–7 to assist in removing foreign matter from the outer surface of the filter media 28.

Figure 11:
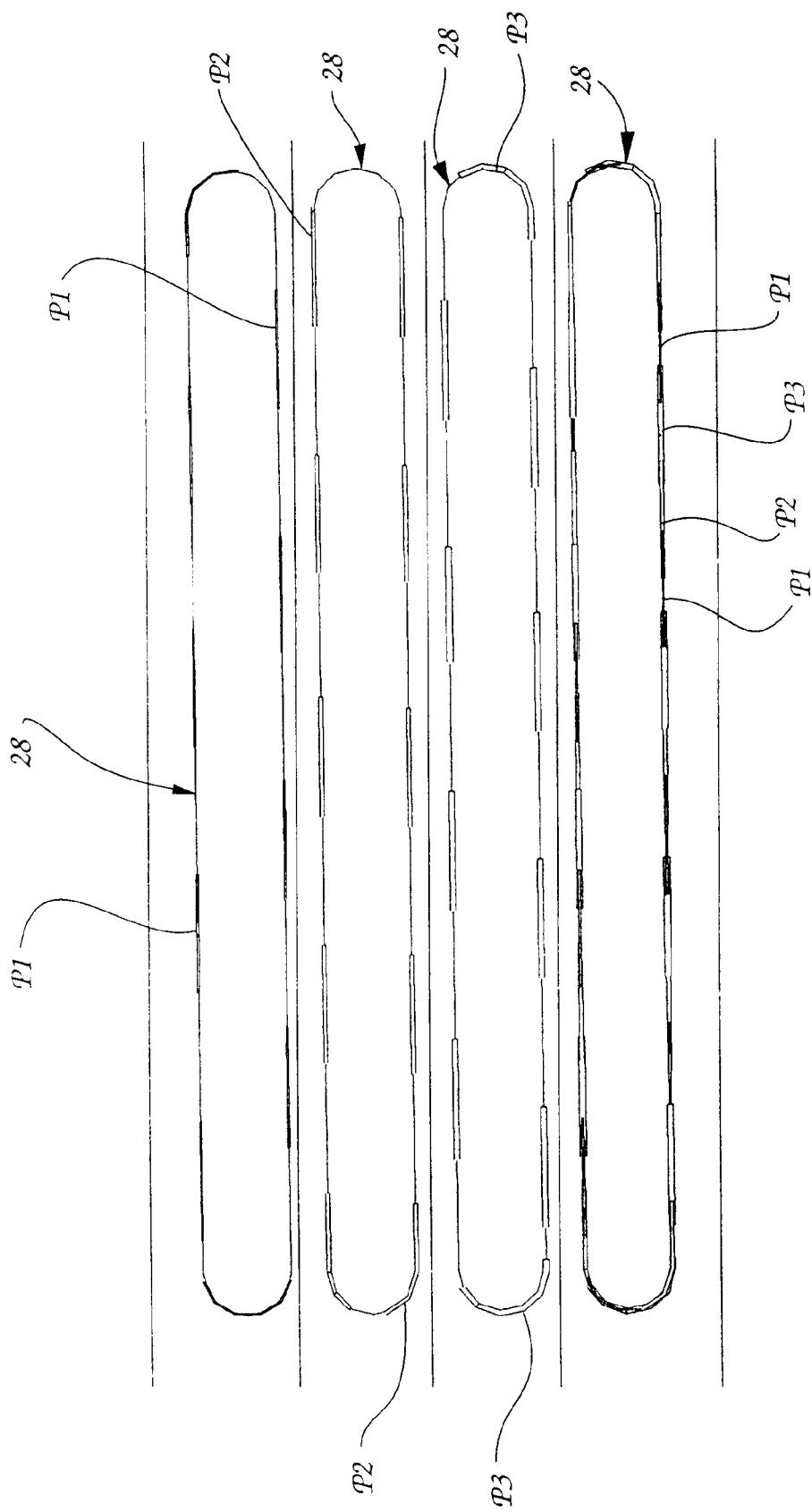
FIG. 11 is a diagrammatic view showing the pattern of pulses of cleaning air generated by the air discharge device of the filter apparatus of FIG. 8.

In accordance with another feature of the present invention, the timing pulleys 92 are designed to have a number of teeth that is not evenly divisible by the number of teeth on the timing drive belt 94, and, as a result, during each complete revolution of the filter media through its endless path, a slightly different segment or portion of the filter media 28 is passing over the lower surface of the hollow cylinder 76 at the time the pulse of cleaning air is generated therefrom. Thus, as illustrated in FIG. 11, a cleaning pulse is generated during each revolution of the air discharge pipe 84, and the cleaning pulse is designed to have a duration that will cause a predetermined segment of the filter media 28 to be cleaned by each pulse, this segment being identified by the reference character P1 in the upper diagrammatic representation of the filter media 28 in FIG. 11. Because of the above-described relationship between the teeth of the timing belt 94 and the timing pulleys 92, and the fact that the cleaning pulses are generated at a constant frequency during each revolution of the air discharge pipe 84, a second segment P2 of the filter media 28 will be cleaned during the next complete revolution of the filter media 28. In a like manner, segments P3 will be cleaned during the third consecutive revolution of the filter media 28, after which the cycle repeats itself. As will be seen in the lowermost diagrammatic illustration in FIG. 11, the duration of the pulses and the relationship between the teeth of the timing belts 94 and the timing pulleys 92 are coordinated so that the segments P1, P2 and P3 will be immediately adjacent one another during each three consecutive revolutions of the filter media 28, and therefore the entire length of the endless filter media 28 will be cleaning during each such three consecutive revolution cycles thereof. While the pattern of clean segments P1, P2 and P3 illustrated in FIG. 11 represents diagrammatically a typical cleaning pattern, it will be apparent that other cleaning patterns may also be used by varying the duration of the cleaning pulses and/or the relationship between the number of teeth in the timing belts 94 and the timing pulleys 92.

Figure 12:
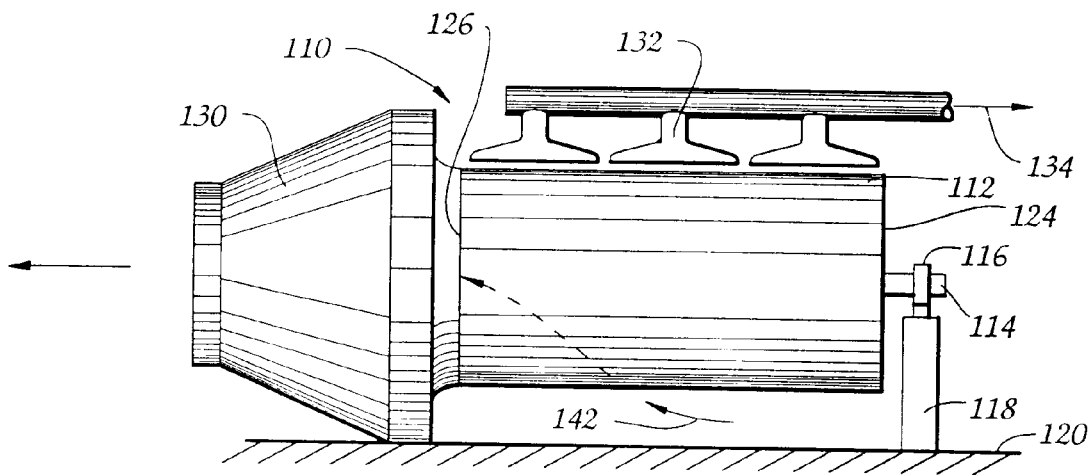
FIG. 12 is a generally diagrammatic side elevational view of another embodiment of the present invention.
Figure 13:
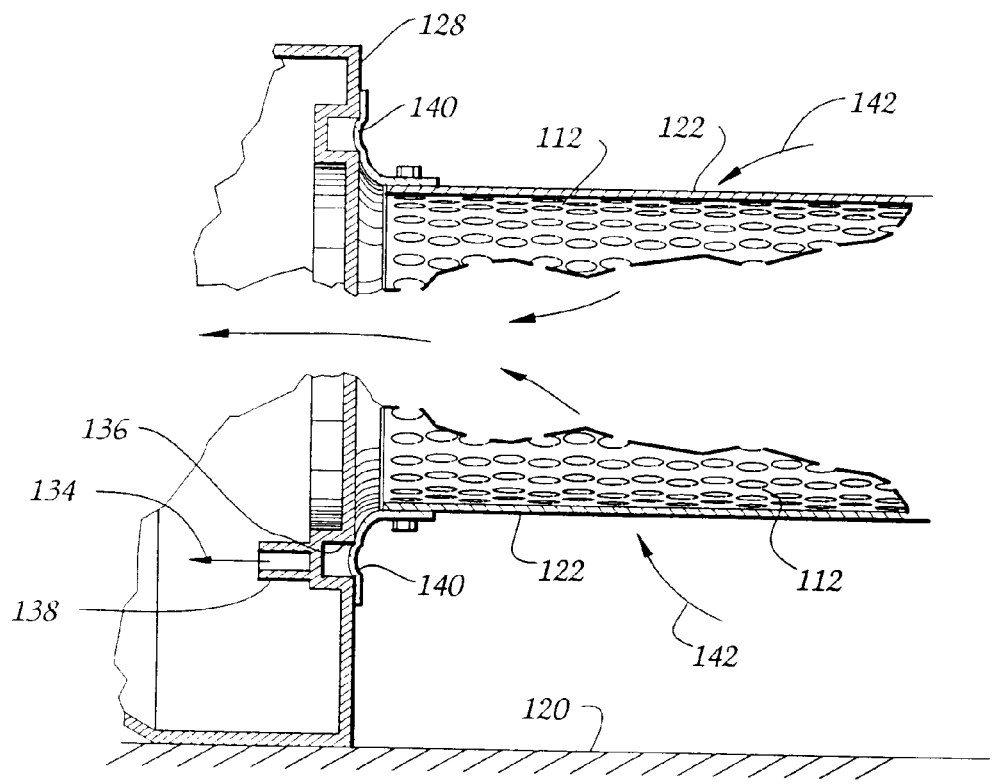
FIG. 13 is a detailed view illustrating the sealing arrangement between the rotating drum and the face plate of the filter apparatus illustrated in FIG. 12.

Another embodiment of the present invention is illustrated in FIGS. 12 and 13 in which a generally conventional rotary drum filter 110 has been modified to provide an improved sealing arrangement. More specifically, the rotary drum filter 110 includes a conventional support frame in the form of a cylindrical perforated drum 112 mounted on a shaft 114 for rotation in a bearing 116 that is mounted at the upper end of a pedestal 118 fixed to the floor 120, and a permeable substrate or filter media 122 is mounted on the outer surface of the cylindrical drum 112. One end 124 of the cylindrical drum 112 is closed, and the other end 126 is open, the open end 126 being disposed closely adjacent a flat base plate 128 that extends upwardly from the floor 120, and an outlet chamber 130 is mounted to the face plate 128. A plurality of conventional suction nozzles 132 are mounted closely adjacent the filter media 122 so that, when a suction is imposed on the nozzles 132, as indicated by the direction arrow 134, the filter media will be cleaned in a conventional manner, all as explained in greater detail below.

As best seen in FIG. 13, the face plate 128 is formed with an annular suction channel 136 located adjacent the outer cylindrical periphery of the drum 112, and a suction conduit 138 is provided to connect the suction channel 136 to any convenient suction source (not shown), which is preferably the same suction source connected to the suction nozzles 132. A strip of sealing material 140 is mounted around one cylindrical edge of the drum 112 along the outer periphery thereof at the open end 126 of the drum 112, and the sealing strip 140 is arranged so that it extends across the open end of the annular suction channel 136 as best seen in FIG. 13.

In operation, the support frame or drum 112 is rotated by a conventional drive motor arrangement (not shown), and transport air having particulate matter entrained therein is caused to flow inwardly through the filter media 122 and openings in the cylindrical surface of the drum 112, whereupon the particulate matter is deposited on the exterior surface of the filter media 122, and the cleaned transport air is then discharged through the open end 126 of the drum 112 and the outlet chamber 130 as indicated by the direction arrow 142. As the drum 112 rotates past the suction nozzles 132, they will remove particulate matter deposited on the exterior surface of the filter media 122 so that the filter media is constantly cleaned as it rotates past the suction nozzles 132.

It will be appreciated that, since the face plate 128 is stationary and the drum 112 is rotating, conventional rotary drum filters have encountered problems in providing an effective seal between the side edge of the open end 126 of the drum 112 and the adjacent face plate to prevent dirty transport air from bypassing the filter media 122 and flowing directly into the interior of the drum 112, thereby contaminating the cleaned transport air with particulate matter in the transport air that bypassed the filter media 122. In accordance with the present invention, a very effective seal is provided between the rotating drum 112 and the stationary face plate 128 in that the sealing strip 140, which may be formed of any suitable flaccid sealing material such as felt or rubber, extends across the open end of the annular suction channel 136 and is drawn into sliding contact with the flat surface of the face plate 128 adjacent the edges of the annular suction channel 136.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A self-cleaning filter for use in removing particulate matter from a transport fluid, said filter comprising:
   (a) a permeable substrate through which the transport fluid can pass inwardly therethrough and deposit the particulate matter on the surface of said substrate, said substrate including edge portions extending along the side edges thereof; and
   (b) a housing that includes:
      (i) a support frame for supporting said substrate for movement along a predetermined path, said support frame including a pair of support surfaces positioned in spaced relation for supporting said edge portions of said substrate, said support surfaces being formed with a suction channel extending therealong beneath said substrate edge portions for drawing said substrate edge portions against said support surfaces to form a seal therebetween and to carry away any particulate matter that may pass through such seal;
      (ii) at least one drive element for moving said substrate along said predetermined path;
      (iii) a suction source connected to said suction channel and operable to impose a suction within said suction channel while said substrate is being moved by said at least one drive element wherein said seal is formed between said substrate edge portions and said support surfaces during movement of said substrate along said predetermined path; and
      (iv) a clean fluid chamber disposed at the interior portion of said substrate from which the transport fluid can be removed after it has passed through said substrate.

2. A self-cleaning filter as defined in claim 1, wherein said substrate is formed as a belt having a plurality of openings therein and includes a filter media attached to said belt.

3. A self-cleaning filter as defined in claim 2, wherein said predetermined path includes at least one straight reach and at least one curved reach, and wherein said filter media includes a plurality of pleats extending outwardly from one surface thereof, said pleats being arranged on said substrate so that said transport fluid can pass inwardly therethrough and deposit said particulate matter on the exterior surface of said pleats, said pleats extending outwardly from said substrate in generally spaced parallel relation to one another when traveling along said straight reach, said pleats extending outwardly from said substrate in an angular relation to one another such that the spacing between adjacent pleats increases along the outwardly extending direction thereof when traveling through said curved reach, and wherein said cleaning device includes a suction nozzle positioned adjacent the exterior surface of said belt at said curved reach thereof for removing said particulate matter deposited on said pleats.

4. A self-cleaning filter as defined in claim 1, wherein said substrate is formed of a filter media material.

5. A method of filtering particulate matter from a transport fluid, said method comprising the steps of:
   (a) providing a substrate having perforate surfaces and opposed edge portions;
   (b) supporting said substrate on support surfaces along said opposed edge portions thereof;
   (c) moving said supported substrate along a predetermined path;
   (d) causing the transport fluid to flow inwardly through said substrate to a clean fluid chamber while depositing particulate matter on the exterior surface of said substrate to thereby clean the transport fluid; and
   (e) while said supported substrate is moving along said predetermined path, creating a suction along said support surfaces and beneath said opposed edge portions of said substrate to draw said edge portions of said substrate against said support surfaces and to form a seal therebetween to keep particulate matter from reaching the cleaned transport fluid within said clean fluid chamber.

6. A method as defined in claim 5, wherein said step of providing a substrate includes providing an endless substrate and said perforate surfaces include a plurality of pleats of filter media that extend outwardly from the outer surface thereof and that have surfaces extending in spaced relation to one another; wherein said step of moving said endless substrate along said predetermined path includes moving said substrate along a predetermined path that includes at least one generally straight reach at which said pleats extend outwardly from said substrate with a relatively small spacing between each two adjacent pleats and at least one curved reach at which said spacing between each two adjacent pleats is increased; wherein said step of causing the transport fluid to flow inwardly through said substrate includes causing the transport fluid to flow inwardly through said pleats to deposit said particulate matter on the exterior surface of said pleats to thereby clean the transport fluid; and wherein an additional step includes creating a suction at said curved reach of said substrate to remove said particular matter from the exterior surface of said pleats while they are disposed with said increased spacing therebetween.

* * * * *